(No Model.)

H. W. LIBBEY.
BICYCLE.

No. 522,908. Patented July 10, 1894.

Witnesses.
Winifred J. Kerwin
Edward E. Brown

Inventor:
Horace W. Libbey
by Edwin Planta
attorney

THE NORRIS PETERS CO., PHOTO-LITHO., WASHINGTON, D. C.

UNITED STATES PATENT OFFICE.

HOSEA W. LIBBEY, OF BOSTON, MASSACHUSETTS.

BICYCLE.

SPECIFICATION forming part of Letters Patent No. 522,908, dated July 10, 1894.

Application filed November 18, 1892. Serial No. 452,371. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Bicycles, of which the following, taken in connection with the accompanying drawings, is a specification.

My invention relates to certain improvements in bicycles and it consists in the peculiar construction of the frame, the method of steering, and in certain details of construction as hereinafter fully described and pointed out in the claims.

Figure 1:
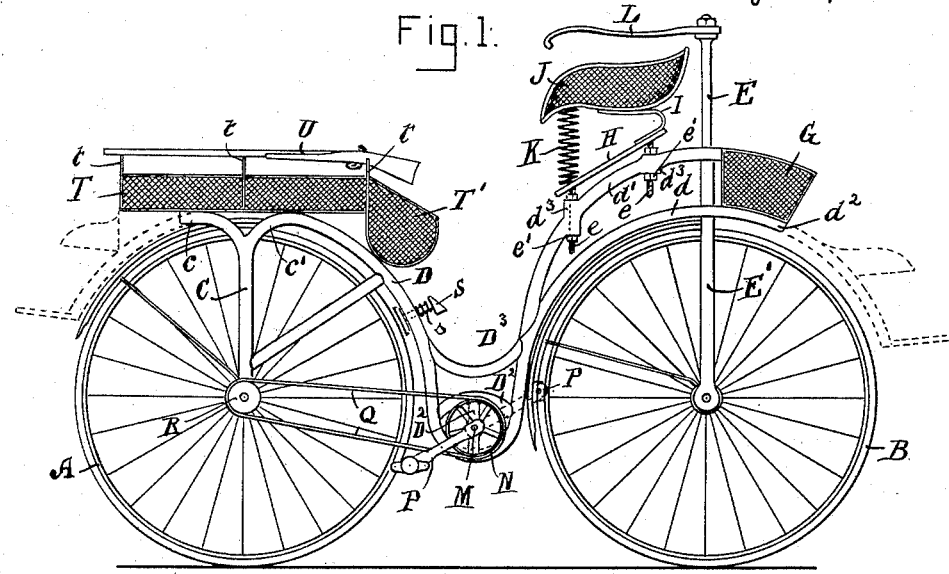
Figure 2:
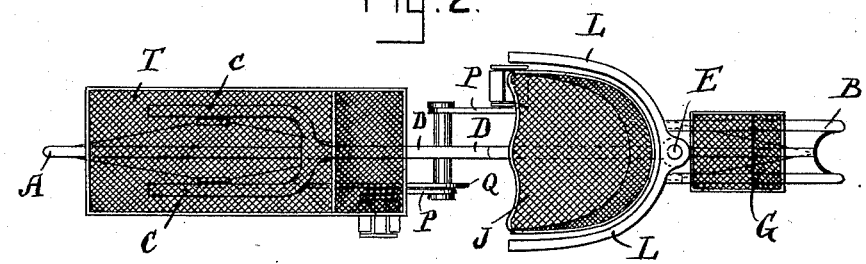
Figure 3:
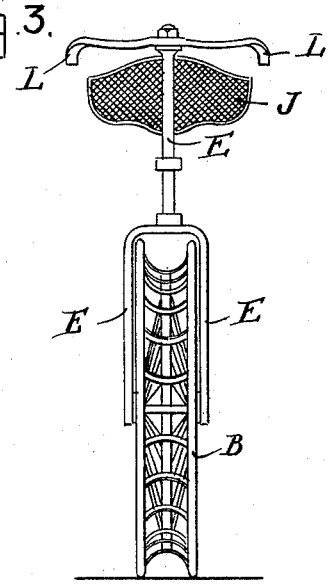

Referring to the accompanying drawings: Figure 1— represents a side view of a bicycle embodying my invention. Fig. 2— is a plan or top view with a double tired rear wheel. Fig. 3— is a rear view of the same.

In bicycles constructed according to my invention, the driving wheel is in front and the steering wheel at the rear.

A, represents the front or driving wheel, and B, the rear or steering wheel. The front wheel is mounted in a vertical fork C, divided at its upper end so that one portion $c$, will project toward the front and the other or rear partition $c'$ is secured to or formed in one with the back bone D, which is of the loop pattern, and at its rear end is made double or forked, the prongs $d$, $d'$, of which extend over the center of the rear wheel B, and embrace the upper end of the steering post E, on the fork E', in which the rear or steering wheel B, is mounted. The prong $d$, of the forked end of the back bone D, is formed with an extension $d^2$, to form a support for a basket or other article G. The prong $d'$ is located above the other one and is formed with two hollow bosses $d^3$, through which screw rods $e$, are passed and secured in the desired position in the bosses by nuts $e'$, these screw rods $e$ are at their upper end secured to a flat plate H, to the rear end of which is fastened one end of a flat spring I, the other end of which is fastened to the under side of the seat J, and to the front end of said plate is secured a spiral spring K, the upper end of which is attached to and supports the front of said seat J. It will be seen that by means of the screw rods $e$, passing through and being adjustable in the bosses $d^3$, that the height and inclination of the seat may be varied as may be desired. The seat I prefer to make of the form shown, that is to say with a flat bottom and wire work sides and back so as to form what might be called a basket seat.

To the upper end of the fork E, is secured a two armed lever L, which arms pass on each side of the seat and form rests for the arms of the person riding the vehicle, and also means for operating the steering wheel B, the arms of the rider resting upon the arms of the lever L, so that by his pushing one or the other backward the steering wheel will be moved in the desired direction.

A single tread steering wheel may be employed as shown in Fig. 1, but I prefer to form the steering wheel with a double tread as shown in Figs. 2 and 3, so as to preserve the equilibrium of the rider, and when the rider desires to stop the vehicle the two treads of the rear wheel and the tread of the front wheel will form three points of support thereby preventing the vehicle from tipping over.

Near the lower central portion of the back bone D, is secured a curved bar D', and an upright $D^2$, is secured between this and the lower part of the back bone which upright is fitted with a suitable bearing to carry the main driving or crank axle shaft M, upon which is mounted the sprocket wheel N, and cranks P, by this construction the axle M, is brought as near the center of the machine as possible and transient motion therefrom to the front driving wheel A, by means of a chain Q, and sprocket wheel R, mounted upon the axle of the wheel A.

By placing the driving wheel in front and the steering wheel at the rear, the driving mechanism is in view of the rider and in case of accident, the machine can be stopped before any additional damage is done, which is not the case where the driving wheel is behind. And again, there is less weight on the front wheel, and consequently it is actuated more easily and more rapidly and it can be started with less exertion than when placed at the rear.

To strengthen the back bone so as to make the frame more rigid, I form the same with a second loop $D^3$, a short distance above the bend of the main portion as shown.

S, is a brake carried by the back bone D, and which can be operated by the foot of the driver, a small spring s, keeping it in its normal position. The brake is longitudinally movable through the back-bone and has a brake shoe on one end and a foot plate on the other end.

The object of dividing the front fork C, as at c, c', is to form a support for baskets or other receptacles T, T', the basket T, may be formed with three central supports t, upon which a rifle U, may be carried.

It will be seen that by this construction of bicycle that the person riding has all the operating parts in view, he can sit upright and in as comfortable a position as if sitting in a chair, he having a rest for his back and arms. The vehicle is self supporting when a wheel with a double tire is used, and by the construction of the frame it is adapted to carry a large amount of baggage, and is particularly adapted for military purposes or for a long journey. It will also be seen that by this construction any sized driving wheel may be employed, and if desired the portion c, of the front fork and the portion $d^2$ of the back-bone may either or both be extended and each provided with a seat and step to carry a child as shown in dotted lines.

What I claim is—

1. In a bicycle, the combination, with the wheels, of a back bone, the front end of which is formed into a vertical fork, said fork being divided at its upper end whereby one portion projects forward and the other portion projects to the rear and unites with the backbone, a basket on the fork, a driving wheel journaled in the fork, a steering fork at the rear end of the backbone, for the steering wheel, and a seat in front of the fork, substantially as set forth.

2. In a bicycle, the combination, with the wheels, of a back-bone, the rear end of which is forked, the branches of the fork being located one above the other, a steering fork journaled in said branches, and a seat upon the upper branch, substantially as set forth.

3. In a bicycle, the combination, with the wheels, of a backbone, the rear end of which is forked, the branches of the fork being located one above the other, the upper branch being provided with perforated bosses, a screw threaded bolt through each boss, nuts above and below the branch for adjusting the height of the bolts, a bar secured to the upper ends of the bolts, a seat yieldingly secured to the bar, and a steering fork journaled in the branches to the rear of the seat, substantially as set forth.

4. In a bicycle, the combination, with the wheels, of a backbone, the rear end of which is forked, the branches of the fork being located one above the other and extended to the rear of the rear wheel, a steering fork journaled in the branches, a seat in front of and a receptacle to the rear of the steering fork, substantially as set forth.

5. In a bicycle, the combination, with a looped frame, of a driving wheel at the front end and a steering wheel at the rear end of the frame, a seat at the rear end of the frame, and a longitudinally movable spring actuated bar through the front curve of the frame, one end of which is provided with a brake shoe and the rear end is provided with a foot plate, substantially as set forth.

In testimony whereof I have signed my name to this specification, in the presence of two subscribing witnesses, on this 1st day of October, A. D. 1892.

HOSEA W. LIBBEY.

Witnesses:
CHAS. STEERE,
EDWIN PLANTA.